United States Patent
Sahar et al.

(10) Patent No.: US 10,587,596 B1
(45) Date of Patent: Mar. 10, 2020

(54) FRAMEWORK FOR AUTHENTICATING NEW USERS

(71) Applicant: EMC IP Holding Company LLC, Hopkinton, MA (US)

(72) Inventors: Carmit Sahar, Tel Aviv (IL); Eyal Kolman, Tel Aviv (IL); Alon Kaufman, Herut (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 582 days.

(21) Appl. No.: 15/086,528

(22) Filed: Mar. 31, 2016

(51) Int. Cl.
*H04L 29/06* (2006.01)

(52) U.S. Cl.
CPC ............ *H04L 63/08* (2013.01); *H04L 63/104* (2013.01)

(58) Field of Classification Search
CPC ... H04L 63/083; H04L 63/0815; H04L 63/08; H04L 63/102; G06F 21/31
See application file for complete search history.

(56) References Cited

U.S. PATENT DOCUMENTS

| | | | |
|---|---|---|---|
| 7,539,746 B2 | 5/2009 | Bankier et al. | |
| 8,381,213 B1 | 2/2013 | Naamad et al. | |
| 8,631,486 B1 | 1/2014 | Friedman et al. | |
| 8,707,308 B1 | 4/2014 | Naamad et al. | |
| 8,856,923 B1 | 10/2014 | Kolman et al. | |
| 8,875,267 B1 | 10/2014 | Kolman et al. | |
| 8,978,159 B1 | 3/2015 | van Dijk et al. | |
| 9,449,007 B1 | 9/2016 | Wood et al. | |
| 9,565,562 B1 | 2/2017 | Bar-Menachem et al. | |
| 9,680,812 B1 * | 6/2017 | Emaminouri | H04L 63/08 |
| 2006/0156385 A1 * | 7/2006 | Chiviendacz | G06F 21/36 726/2 |
| 2010/0121850 A1 * | 5/2010 | Moitra | G06F 16/95 707/737 |
| 2010/0306016 A1 * | 12/2010 | Solaro | G06Q 10/06316 705/7.26 |
| 2012/0214442 A1 * | 8/2012 | Crawford | H04W 12/06 455/411 |

* cited by examiner

*Primary Examiner* — Alexander Lagor
*Assistant Examiner* — Sanchit K Sarker
(74) *Attorney, Agent, or Firm* — BainwoodHuang

(57) ABSTRACT

Techniques of authenticating a new user involve classifying a new user as a member of a group based on the new user's current activity. Along these lines, when a new user enrolls in an authentication system, the authentication system places the new user in a group of new users that have not made any requests and are assumed to be high risks of making fraudulent requests. Once the new user makes a request to access a resource, the authentication system classifies the new user as a member of another group according to authentication factors describing activities surrounding the request.

19 Claims, 5 Drawing Sheets

Group Classification Manager 150

Activity-Related Authentication Factors 152 describing activities performed by New User 114

Group Definitions 154

| Activity-Related Authentication Factors 210(1) describing activities performed by Group 212(1) | Activity-Related Authentication Factors 210(2) describing activities performed by Group 212(2) | ... | Activity-Related Authentication Factors 210(N) describing activities performed by Group 212(M) |

Distance Computation Manager 156

| Distance 220(1) between Activity-Related Authentication Factors 210(1) and 152 | Distance 220(2) between Activity-Related Authentication Factors 210(2) and 152 | ... | Distance 220(M) between Activity-Related Authentication Factors 210(M) and 152 |

Group Selection Manager 158

Distance 220(2) is a minimum over all distances 220(1..M) and new user 114 is assigned to group 212(2)

FIG. 2

FRAMEWORK FOR AUTHENTICATING NEW USERS

BACKGROUND

When users request access to resources, some authentication systems grant or deny the requests based on behavioral profiles of the users. Such behavior profiles indicate conditions under which the users previously requested access to resources. For example, suppose that a user submits a request to access a resource. If an authentication system finds, in making the request, that the user is behaving anomalously with respect to that user's behavioral profile, the authentication system may take remedial steps before granting the user access to the resource.

SUMMARY

New users pose challenges for authentication systems that grant or deny requests to access resources based on behavioral profiles of users. Assessing risk associated with a request to access resources from a new user is crucial because new users are more likely to submit fraudulent requests. However, such users do not have any behavioral profile on which to base decisions to grant or deny requests to access resources.

A conventional approach to authenticating a new user involves placing the new user in a group based on static attributes. For example, suppose that a new accountant registers an account at a corporation. In this case, that employee might be placed in a group of accountants that work for a particular manager, the static attributes of the group being the type of employee (accountant) and manager. An authentication system would then authenticate the new user based on the static attributes of the group.

Unfortunately, there are deficiencies with the above-described conventional approach to authenticating a new user. For example, such an approach ignores the risky aspects of a typical new user. Along these lines, the placement of a new user in a group based on static attributes allows the new user to be authenticated based on attributes shared by trusted users. Thus, authenticating a new user based on attributes of a trusted group ignores the additional risk that a new user brings.

In contrast to the above-described conventional approach to authenticating new users, improved techniques involve classifying a new user as a member of a group based on the new user's current activity. Along these lines, when a new user enrolls in an authentication system, the authentication system places the new user in a group of new users that have not made any requests and are assumed to be high risks of making fraudulent requests. Once the new user makes a request to access a resource, the authentication system classifies the new user as a member of another group according to authentication factors describing activities surrounding the request. For example, suppose the new user requests access to a particular server through an email application. In this case, the authentication system classifies the user as a member of a group whose members have accessed that particular server through that email program. However, in most cases the activities performed by the new user will not perfectly match activities performed by members of any predefined group. In such a case, the authentication system finds classifies the new user by minimizing a distance measure between authentication factors describing activities performed by the new user and the authentication factors describing activities performed by members of all predefined groups. Upon receiving a subsequent request from the new user, the authentication system authenticates the new user according to attributes of the group in which the new user is classified. Advantageously, the improved techniques provide a relatively accurate assessment of the risk of granting a new user access to a resource.

One embodiment is directed to a method of authenticating a user to control access to an electronic resource. The method includes receiving, by processing circuitry, a first set of authentication factors describing electronic activities being performed by a new user. The method also includes, based on the first set of authentication factors, classifying, by the processing circuitry, the new user as a member of a particular group of users that (i) have performed the electronic activities and (ii) share a set of attributes described by a second set of authentication factors. The method further includes, after classifying the new user as a member of the particular group of users, receiving, by the processing circuitry, a request from the new user to access the electronic resource. The method further includes, in response to receiving the request, performing, by the processing circuitry, an authentication operation on the request based on the first set of authentication factors and the second set of authentication factors, the authentication operation producing an authentication result indicating whether to grant or deny the new user access to the electronic resource.

Additionally, some embodiments are directed to a system constructed and arranged to control access to a resource. The system includes memory and controlling circuitry constructed and arranged to carry out a method of authenticating a user to control access to an electronic resource.

Further, some embodiments are directed to a computer program product having a non-transitory computer readable storage medium that stores instructions which, when executed by a computer, cause the computer to carry out the method of authenticating a user to control access to an electronic resource.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

FIG. 2 is a flow chart illustrating an example model generation within the electronic environment shown in FIG. 1.

DETAILED DESCRIPTION

Improved techniques of authenticating new users involve classifying a new user as a member of a group based on the new user's current activity. Along these lines, when a new user enrolls in an authentication system, the authentication system places the new user in a group of new users that have not made any requests and are assumed to be high risks of making fraudulent requests. Once the new user makes a request to access a resource, the authentication system classifies the new user as a member of another group according to authentication factors describing activities surrounding the request. Advantageously, the improved techniques provide a relatively accurate assessment of the risk of granting a new user access to a resource.

Figure 1:
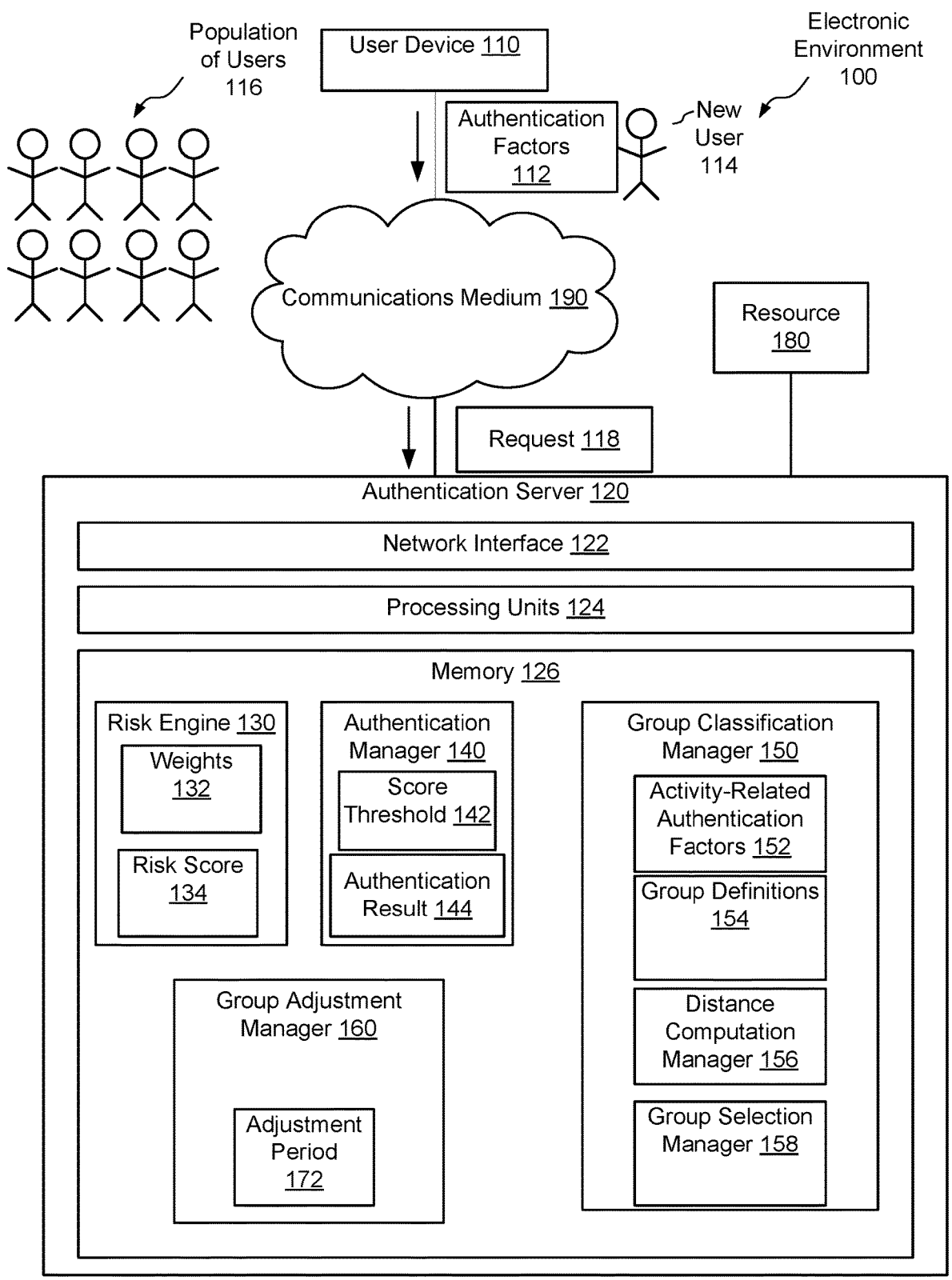
FIG. 1 is a block diagram illustrating an example electronic environment in which the improved technique can be carried out.

FIG. 1 shows an example electronic environment 100 in which embodiments of the improved techniques hereof can be practiced. Here, electronic environment 100 includes a user device 110, an authentication server 120, and an electronic network 190.

The user device 110 is configured to run applications that request access to the resource 180 via electronic network 190 and send authentication factors 112 and requests such as request 118 to the authentication server 120. Typically, the user device 110 is a mobile device such as a smartphone, PDA, or tablet computer. However, in some arrangements, the user device 110 may be a desktop or laptop computer. For example, the new user 114 on the user device 110, e.g., a smartphone, may send authentication factors 112 to the authentication server 120 in the process of using an application that runs on the user device 110. Further, the user device 110 may also send the request 118 for access to the resource via some application running on the user device 110.

The communications medium 190 provides network connections between the authentication server 120 and the user device 110. The electronic network 190 may implement any of a variety of protocols and topologies that are in common use for communications over the Internet or other networks. Further, the electronic network 190 may include various components (e.g., cables, switches/routers, gateways/bridges, etc.) that are used in such communications.

The authentication server 120 is configured to authenticate users from the population of users 116, including new user 114, in order to control access to the resource 180. As illustrated in FIG. 1, the access control server 120 is implemented as a computer system that is in communication with the user device 110 over the electronic network 160. The access control server 120 is seen to include one or more network interfaces 122, a set of processing units 124, and memory 126. The network interfaces 122 include, for example, Ethernet adapters, Token Ring adapters, and the like, for converting electronic and/or optical signals received from the electronic network 190 to electronic form for use by the authentication server 120. The set of processing units 124 include one or more processing chips and/or assemblies. The memory 126 includes both volatile memory (e.g., RAM), and non-volatile memory, such as one or more ROMs, disk drives, solid state drives, and the like. The set of processing units 124 and the memory 126 together form control circuitry, which is constructed and arranged to carry out various methods and functions as described herein.

The memory 126 includes a variety of software constructs realized in the form of executable instructions, such as a risk engine 130, an authentication manager 140, a group classification manager 150, a risk engine, and a group adjustment manager 170. When the executable instructions are run by the set of processing units 124, the set of processing units 124 are caused to carry out the operations of the software constructs. Although certain software constructs are specifically shown and described, it is understood that the memory 126 typically includes many other software constructs, which are not shown, such as an operating system, various applications, processes, and daemons, for example. The memory 126 is also constructed and arranged to store various data.

The risk engine 130 is a software construct configured to compute a risk score 134 in response to receipt of a request 118 to access the resource 180. The risk score 134 is indicative of the degree to which the request 118 represents behavior anomalous to the new user 114. The risk engine computes the risk score 134 by taking as input authentication factors received with the request 118 and applying weights 132 to those authentication factors. Each weight 132 indicates a level of importance of a corresponding authentication factor in determining the risk score 134.

The authentication manager 140 is a software construct configured to output an authentication result 144 indicating that access to the resource 180 is granted or denied to the new user 114. The authentication result 144 indicates a grant or denial of access based on the risk score 134 output from the risk engine 130. For example, if the risk score 134 is greater than a score threshold 142, then the authentication result 144 indicates a denial of the request 118. If the risk score 134 is greater than a score threshold 142, then the authentication result 144 indicates a granting of the request 118.

The group classification manager 150 is a software construct configured to classify the new user 114 as a member of a group of users from predefined multiple groups of users. Once the group classification manager 150 classifies the new user 114 as a member of a particular group, then the authentication manager 140 may generate an authentication result 144 for the new user 114 when the new user 114 submits the request 118 to access the resource 180. The group classification manager 150 includes a distance computation manager 156 and a group selection manager 158 and stores activity-related authentication factors 152 describing activity performed by the new user 114 and group definitions 154.

The activity-related authentication factors 152 are data indicating recent activity undertaken by the new user 114. For example, suppose that the new user has attempted to access a particular server having an IP address. Then the activity-related authentication factors 152 may include the IP address, other identifying information of particular server, a time and date of access, an IP address from which the access attempt took place, a geolocation from which the access attempt took place, and so on.

The group definitions 154 are data defining each of the multiple groups in which the new user 114 may be classified. Each of the groups is defined by a first set of authentication factors describing activities performed by members of that group and a second set of authentication factors describing attributes of the members of that group. The members of each of the groups are taken from the population of users 116. The authentication server 154 forms each of the groups by using, for example, cluster-based methods that group similar users into a group.

The distance computation manager 156 is a software construct configured to output a measure of distance between the activity-related authentication factors 152 and the first set of authentication factors of each of the groups defined by the group definitions 154. In one arrangement, the distance computation manager 156 outputs a Mahalanobis distance, i.e., a weighted sum of differences between the activity-related authentication factors 152 and the first set of authentication factors of a group. In another arrangement, the distance computation manager 156 outputs a weighted geometric mean of the differences between the activity-related authentication factors 152 and the first set of authentication factors of the group.

The group selection manager 158 is a software construct configured to select a group in which to classify the new user 114. The classification of the new user 114 is based on the output of the distance computation manager 156, i.e., the distances for each of the groups defined by the group definitions 154. In a typical operation, the group selection manager 158 selects the group for which the distance is a minimum over all of the distances.

The group adjustment manager 170 is a software construct configured to reclassify the new user 114 as a member of a new group as defined by the group definitions 154. Such a reclassification may occur in response to new activity being performed by the new user. Alternatively, a reclassification may be performed after a predefined adjustment period 172.

During example operation, the new user 114 registers with the authentication server 120 in order to attempt to access the resource 180. In this way, the new user 114 is able to request access to the resource 180 without having established any sort of behavioral profile from which to make authentication decisions. Because the new user 114 is typically a high risk for committing fraud, the authentication server 120 classifies the new user 114 in a preliminary group consisting of other new and high-risk users. In this way, any request 118 to access the resource 180 from the new user 114 is scrutinized more than would be the case had the new user 114 been classified as a member of a group having similar attributes (e.g., same manager, same job function, etc.).

At some point after registration, the new user 114 performs some activity on the user device 110. For example, suppose that the new user 114 stores a document on a particular server having an IP address. Then the authentication server 120 stores activity-related authentication factors 152 that include the IP address, other identifying information of particular server, a time and date of access, an IP address from which the access attempt took place, a geolocation from which the access attempt took place, the type of action (saving a document), and so on.

FIG. 2 illustrates some detail as to how the group classification manager 150 selects a group in which to classify the user 114. Here, activity-related authentication factors 152 have been stored in the memory 126. The group classification manager 150 will compare these activity-related authentication factors 152 to similar such factors in each group.

As mentioned above, the group definitions 154 define M groups 212(1), . . . , 212(N). Each of the groups 212(1), . . . , 212(M) include a respective set of activity-based authentication factors 210(1), . . . , 210(M) describing activities performed by members of that group. These groups 212(1), . . . , 212(M) are defined in advance of the classification process.

The group classification manager 150 then begins selecting one of the groups 212(1), . . . , 212(M) in which to classify the new user 114. Along these lines, the distance computation manager 156 computes respective distances 220(1), . . . , 220(M) between the activity-related authentication factors 152 and the above-described first set of authentication factors 210(1), . . . , 210(M) of each of the groups 212(1), . . . , 212(M). The group selection manager 158 then selects the group in which to classify the new user 154 based on the computed distance measures, i.e., the group having the smallest such distance of the distances 220(1), . . . , 220(M).

Returning to FIG. 1, at some point in time later after the new user 114 has been classified, the new user 114 generates, on the user device 110, the request 118 to access the resource 180. For example, the new user 114 may attempt to access a sensitive document. In another example, the new user 180 may be attempting to log into a system or a mobile device.

In response to receiving the request 118, the risk engine 130 computes a risk score 134 that indicates whether the act of submitting the request 118 represents behavior anomalous to the new user 114. The authentication manager 140 then compares the risk score 134 to the score threshold 142 to produce an authentication result 144 that indicates whether the new user is granted or denied access to the resource 180. Alternatively, the authentication result 144 may indicate that a step-up authentication is needed.

Figure 3:
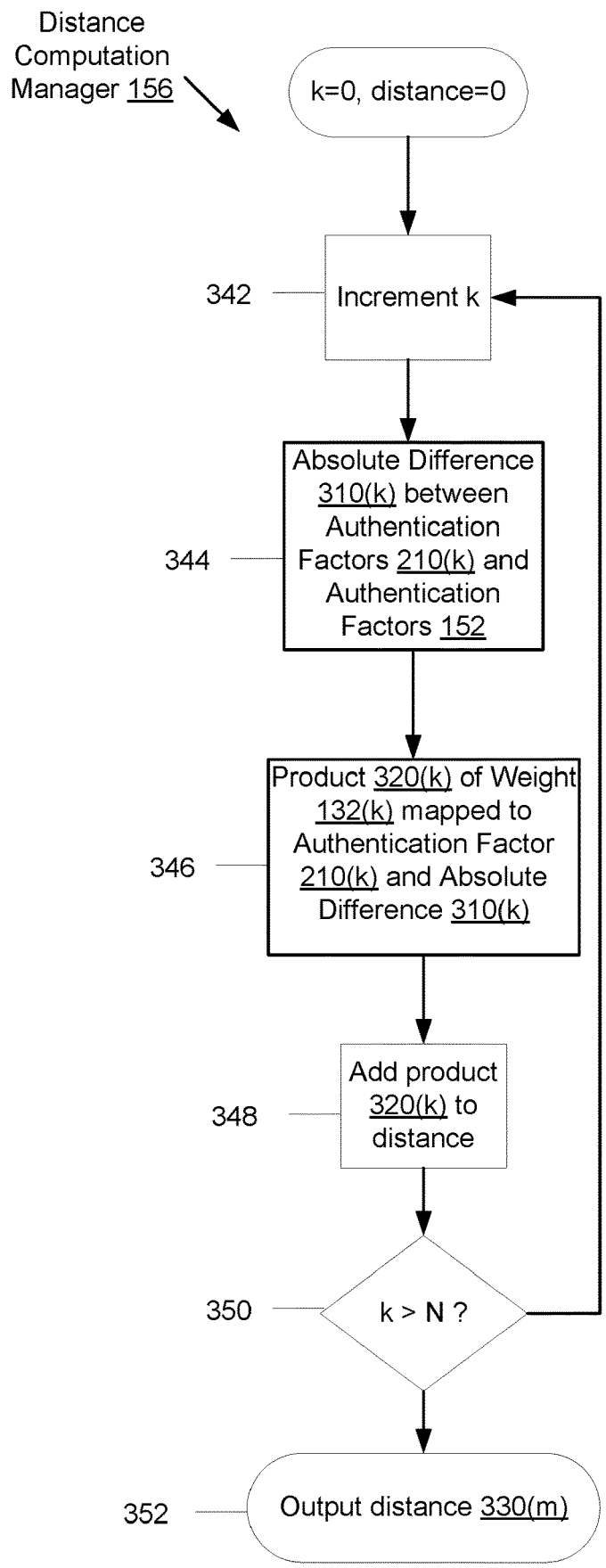
FIG. 3 is a flow chart illustrating an example application of a model to the determination of an authentication scheme within the electronic environment shown in FIG. 1.

FIG. 3 illustrates further details of the distance computation manager 156 in the form of an example procedure to compute the distance 330(m) between the activity-related authentication factors 152 and the activity-related authentication factors 210(m) corresponding to group 212(m), where 1<=m<=M. In this procedure, a distance and an index k which refers to the kth authentication factor out of N such factors are initialized to zero. At 342, the distance computation manager 156 increments the index k.

At 344, the distance computation manager 156 evaluates the absolute value of the difference 310(k) between the kth activity-related authentication factor 152 and the kth activity-related authentication factor 210(m). At 346, the distance computation manager 156 obtains a weight 132 corresponding to the kth activity-related authentication factor 152 and multiples the absolute difference 310(k) by the weight 132 to form a product 320(k). At 348, the distance computation manager 156 adds this product 320(k) to the distance 330(m).

At 350, the distance computation manager 156 checks to see if all of the relevant activity-related authentication factors 210(m) have been evaluated. If not, then the process repeats beginning at 342. If so, then the distance computation manager 156 outputs the resulting distance 330(m).

Figure 4:
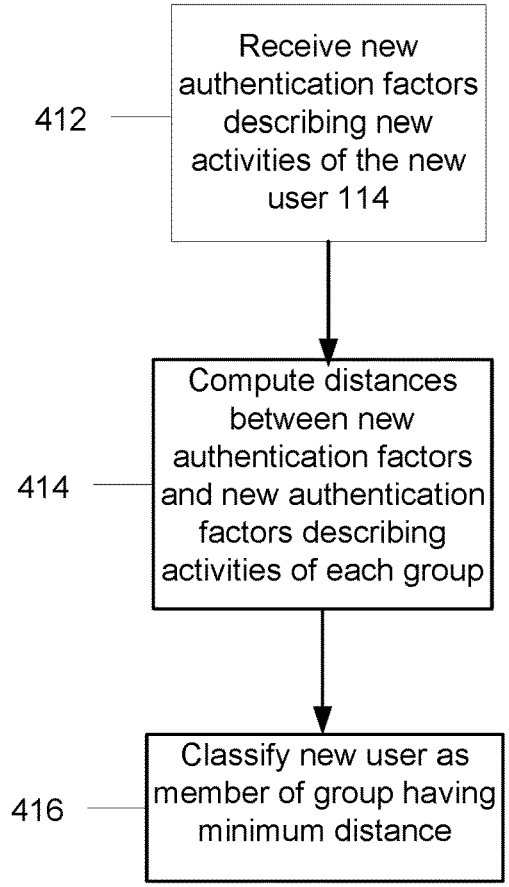
FIG. 4 is a flow chart illustrating an example adjustment of a model within the electronic environment shown in FIG. 1.

FIG. 4 illustrates an example process run by the group adjustment manager 170. Sometime after the new user has been classified, e.g., after the adjustment period 172 and after the new user 114 has performed additional activities that change the activity-related authentication factors 152, the group adjustment manager 170 initiates the reclassification of the user as a member of another group.

At 412, the group adjustment manager receives new activity-related authentication factors that describe new activities of the new user 114. At 414, the group adjustment manager 170 causes the distance computation manager 156 to compute distances between the new authentication factors and new authentication factors describing activities performed by each member of each group. At 416, the group adjustment manager 170 causes the group selection manager to reclassify the new user 114 as a member of another group based on the computed distances.

Figure 5:
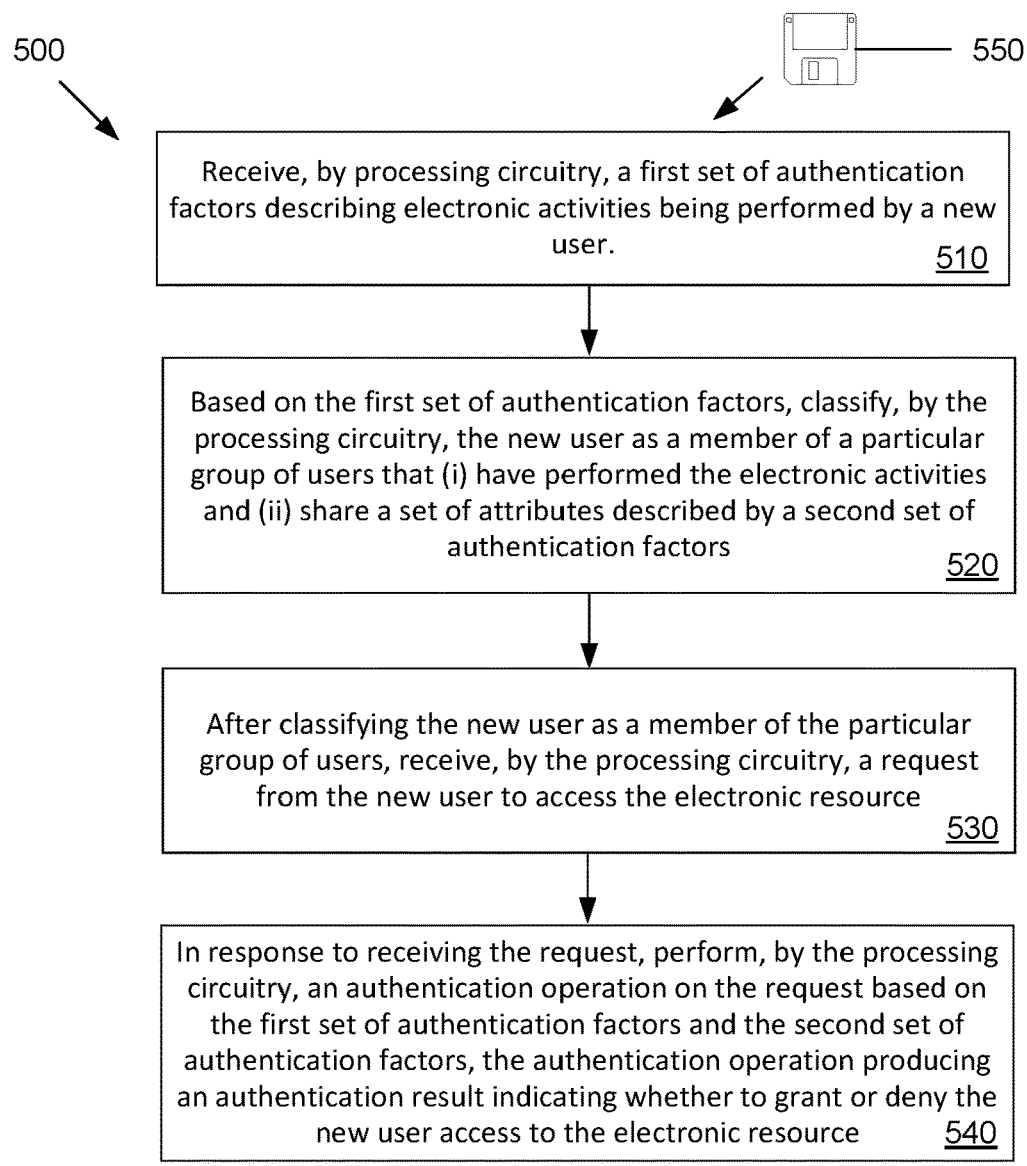
FIG. 5 is a flow chart illustrating an example method of processing the write requests within the electronic environment shown in FIG. 1.

FIG. 5 illustrates a method 500 of authenticating a user to control access to an electronic resource. The method 500 may be performed by the software constructs described in connection with FIG. 1, which reside in the memory 126 of the authentication server 120 and are run by the set of processing units 124.

At 510, the authentication server 120 receives a first set of authentication factors describing electronic activities being performed by a new user.

At 520, the authentication server 120 classifies, based on the first set of authentication factors, the new user as a member of a particular group of users that (i) have performed the electronic activities and (ii) share a set of attributes described by a second set of authentication factors.

At 530, the authentication server 120 receives, after classifying the new user as a member of the particular group of users a request from the new user to access the electronic resource.

At 540, the authentication server 120 performs, in response to receiving the request, an authentication operation on the request based on the first set of authentication factors and the second set of authentication factors, the authentication operation producing an authentication result indicating whether to grant or deny the new user access to the electronic resource.

Improved techniques of authenticating a new user involve classifying a new user as a member of a group based on the new user's current activity. Along these lines, when a new user enrolls in an authentication system, the authentication system places the new user in a group of new users that have not made any requests and are assumed to be high risks of making fraudulent requests. Once the new user makes a request to access a resource, the authentication system classifies the new user as a member of another group according to authentication factors describing activities surrounding the request. Advantageously, the improved techniques provide a relatively accurate assessment of the risk of granting a new user access to a resource.

Having described certain embodiments, numerous alternate embodiments or variations can be made. For example, the above examples illustrated a Mahalanobis distance measure in selecting a group. However, a distance metric based on a geometric mean of differences may also be used.

It should be understood that conventional data-driven risk assessments security systems, e.g., conventional data science modules, assign risk scores to users based on deviations from their regular learned behavior. An inherent drawback of this conventional approach is handling new users with no history to learn from. This point is critical because new users are more likely to be the ones generating an attack; some known attacks involved generating new fictional users and using these fictional users for malicious internal activities. Hence, it is crucial to assign accurate risk scores to new users.

One should appreciate that advanced but conventional risk-based detection and authentication systems detect risky activities and impersonation attacks through anomaly detection methods: the regular behavior of users is learned based on their historical data, and activities like logins, accessing server, or communication with external domain are compared to the user's historical profile. If the activity characteristics deviate from the expected behavior, a high risk score is assigned and an alert is issued.

A drawback of this advanced but conventional approach is its handling of new users. By definition, new users do not have history of activities so a profile of their behavior cannot be generated, nor can deviations be discovered. This point is critical because new users are likely to be the ones generating an attack; some known attacks involved generating new fictional users and using these fictional users for malicious internal activities. Hence, it is crucial to assign accurate risk scores to new users.

The most common approach for handling new users is two-fold: 1) assigning a risk score based on prior knowledge (e.g., logins from a hostile foreign country are risky), and 2) generating the user profile by assuming that the user behavior is similar to the behavior of its group. For example, new users automatically receive the profile of their group and the individual profile gradually changes as more data arrives about the user.

The delicate point involves assigning the user to its most suitable group. Groups should be clusters of known users, who display similar behavior to the new user, e.g. work at the same location, access the same assets in the enterprise, have very similar roles, and so on. Usually, there would be between tens to thousands of groups.

If the user is assigned to the wrong group, the profile that is assigned to him would be incorrect and the deviations and assigned risk scores would also be incorrect. Hence, it is important to decide which group is indeed the group the user belongs to. The standard way to assign a user to a group is based on the user location, professional role, or position in the organizational chart. For example, a user in Country X will be assigned to the Country X group; a sales person will be assigned to the sales group; or a combination of the two—a sales person in Country X will be assigned to the Country X-sales group. A simpler approach is to generate groups of employees that report, not necessarily directly, to the same manager and assign the new user to a group based on his manager.

As described herein and in contrast to conventional approaches, data-driven techniques that improve risk assessment of new users involve matching the most suitable group, out of a set of predefined groups, to a new user. Such techniques may user weighed distance metrics based on the particular context, i.e. the risk model in which risk is assessed.

In particular, such improved techniques match the most suitable group to a user. Such improved techniques are data-driven and are well suited because the user should be assigned to the group that fits the user the most. That is, the user is placed with the group whose characteristics are most similar to the user's characteristics. In some arrangements, the list of groups already exists and the only question is which group to assign the user to.

A first example involves a VPN risk assessment model which focuses on user's location (e.g., country), device, and amount of extracted data. Here, a user is assigned to a group with similar locations (e.g., from the same country), similar devices (e.g., laptops from a particular manufacturer), and similar amounts of extracted data (e.g., few hundreds MBs per session)

A second example involves models that detect internal suspicious activities that focus on the server that the user accesses, the access times, the applications that are applied, etc. Therefore, a suitable group would be users that access the same servers as the user at similar times, apply the same applications, etc. This will automatically assign, for example, a new IT user to the user's proper group.

One should thus appreciate that the improved techniques utilize model-based similarity. Different groups may be assigned per specific risk models. For example, in risk models involving impersonation and credentials theft, features like location and device may be most relevant. In risk models involving data theft and exfiltration, features like permissions, accessed servers and communication to external domains may be more relevant.

An improved process involves defining the relevant features per the specific risk model Next, the process involves extracting each feature's significance (i.e., weights) from the risk model. For example, if the model assigns a high weight to the user's location, then the user-group distance of this feature is more relevant.

In connection with extracting the user-group distance, there may be extraction of the user's values over the above chosen features, based on the user's activities (if available) and any available databases (e.g., HR data, list of permissions, mailing groups, etc.). Additionally, to calculate the user-group distance, the distance should consider the weights of the features. Suitable distance measures include a Mahalanobis distance or weighted sum of the features user-group distances, weighted geometric average of the features user-group distances, and the like.

Next, the process assigns the user to the group with the minimal distance.

The outcome of the above process is a more accurate assignment of users to their relevant groups, which yields a more accurate differentiation between risky and non-risky new users.

Moreover, the user-group assignment is tailored per risk-assignment model which allows more flexible assignments—the user can be assigned to different groups per model. This results in a more accurate detection and fewer false alarms.

It should be understood that new non-legitimate users (e.g., users that were generated by attackers) would probably not have a good match to any of the groups since their characteristics may not be similar enough to a group of legitimate users. In this case, we can use this process to alert on 'unexpected new users behavior' and mark this new user as risky.

Without such improved techniques, conventional approaches simply assign users to a group based on a small pre-defined set of features, mainly location and role in the organization. This overlooks a lot of available information which may generate incorrect group assignments, due to the fact that the relevant features did not receive the correct weight for the current risk model. Additionally, this conventional approach ignores the fact that users can be assigned to different groups, depending on the risk model perspective. The result is incorrect risk scores, false alerts and misdetection of attacks.

However, with the improved techniques, there can be usage of all available information—both about the user and the specific risk model (i.e. context) in which risk is assessed, which results in better group assignments and a higher accuracy. The added flexibility of such improved techniques provides more accurate alerts on new users—thus dealing with the weak point in most security systems.

One should appreciate that the above-described techniques do not merely classify a new user in order to assess the risk of granting access to a resource. Rather, the disclosed techniques involve an improvement to an industrial process, namely providing security to a resource in the face of high-risk users.

In some arrangements, the authentication server 120 is implemented by a set of cores or other types of control/processing circuitry running software. In such arrangements, the software instructions can be delivered, within the authentication server 120, in the form of a computer program product 550. Alternative examples of suitable computer readable storage media include tangible articles of manufacture and apparatus such as CD-ROM, flash memory, disk memory, tape memory, and the like.

While various embodiments of the invention have been particularly shown and described, it will be understood by those skilled in the art that various changes in form and details may be made therein without departing from the spirit and scope of the invention as defined by the appended claims.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is intended to be set forth in this document.

What is claimed is:

1. A method of authenticating a user to control access to an electronic resource, the method comprising:
   receiving, by processing circuitry, a first set of authentication factors describing electronic activities being performed by a new user, the electronic activities described by the first set of authentication factors including at least one of (i) a server that the new user accesses, (ii) times at which the user accesses the server, and (iii) accessed applications;
   based on the first set of authentication factors, classifying, by the processing circuitry, the new user as a member of a particular group of users that (i) have performed the electronic activities and (ii) share a set of attributes described by a second set of authentication factors;
   after classifying the new user as a member of the particular group of users, receiving, by the processing circuitry, a request from the new user to access the electronic resource; and
   in response to receiving the request, performing, by the processing circuitry, an authentication operation on the request based on the first set of authentication factors and the second set of authentication factors, the authentication operation producing an authentication result indicating whether to grant or deny the new user access to the electronic resource,
   wherein new sets of authentication factors are received at specified intervals, and wherein the method further comprises, after classifying the new user as a member of the particular group of users:
      receiving a new set of authentication factors, the new set of authentication factors describing new electronic activities being performed by the new user;
      for each of the multiple groups of users, generating a distance measure between a set of authentication factors describing the new set of electronic activities performed by the new user and the new set of authentication factors describing the new set of electronic activities performed by each member of that group of users; and
      selecting a new group of users for which the distance measure is a minimum over the multiple groups of users.

2. A method as in claim 1, wherein the particular group of users is one group among multiple groups of users;
   wherein classifying the new user as a member of the particular group of users includes:
      for each of the multiple groups of users, generating a distance measure between the first set of authentication factors describing the electronic activities performed by the new user and the first set of authentication factors describing electronic activities performed by each member of that group of users, the distance measure indicating a measure of closeness between the electronic activities performed by the new user and the electronic activities performed by each member of that group of users; and selecting, as the particular group of users, a group of users for which the distance measure is a minimum over the multiple groups of users.

3. A method as in claim 2, wherein performing the authentication operation includes generating a risk score for the request from a risk model, the risk score being a number indicating a level of anomalous behavior from that expected of the new user, a large risk score indicating a high level of anomalous behavior, a small risk score indicating a low level of anomalous behavior, the risk model mapping each authentication factor of the first set of authentication factors and the second set of authentication factors to a respective weight, the weight indicating an importance of that authentication factor to the level of anomalous behavior of the new user.

4. A method as in claim 3, wherein generating the distance measure includes, for each of the multiple groups of users:
for each of the first set of authentication factors, forming an absolute difference between that authentication factor describing a respective electronic activity performed by the new user and that authentication factor describing the respective electronic activity performed by each member of that group of users; and
producing, as the distance measure, a sum of products of (i) the absolute distance for each of the first set of authentication factors and (ii) the respective weight to which the risk model maps that authentication factor.

5. A method as in claim 3, wherein, prior to receiving the first set of authentication factors describing the electronic activities being performed by the new user, the method further comprises:
selecting the electronic activities from a plurality of electronic activities performed by a large group of users, each of the first set of authentication factors describing a respective selected electronic activity performed by a user of the large group of users;
selecting the set of attributes from a plurality of attributes of the large group of users, each of the second set of authentication factors describing the an attribute of a user of the large group of users; and
forming each of the multiple groups of users based on the first set of authentication factors and the second set of authentication factors.

6. A method as in claim 1, wherein new sets of authentication factors are received periodically.

7. A method as in claim 1, further comprising, prior to receiving the first set of authentication factors, classifying the new user as a member of a preliminary group based on a preliminary set of authentication factors describing a set of attributes shared by the new user and each member of the preliminary group.

8. A method as in claim 1, further comprising:
based on the first set of authentication factors, creating a behavioral profile for the new user from which to make authentication decisions, the behavioral profile including multiple activity-based authentication factors as at least some of the second set of authentication factors, and
updating the multiple activity-based authentication factors of the second set of authentication factors with expected values based on subsequent activity of the new user.

9. A computer program product including a non-transitory, computer-readable storage medium which stores executable code, which when executed by a computer, causes the computer to perform a method of authenticating a user to control access to an electronic resource, the method comprising:
receiving a first set of authentication factors describing electronic activities being performed by a new user;
based on the first set of authentication factors, classifying the new user as a member of a particular group of users that (i) have performed the electronic activities and (ii) share a set of attributes described by a second set of authentication factors;
after classifying the new user as a member of the particular group of users, receiving a request from the new user to access the electronic resource; and
in response to receiving the request, performing an authentication operation on the request based on the first set of authentication factors and the second set of authentication factors, the authentication operation producing an authentication result indicating whether to grant or deny the new user access to the electronic resource,
wherein new sets of authentication factors are received at specified intervals, and
wherein the method further comprises, after classifying the new user as a member of the particular group of users:
receiving a new set of authentication factors, the new set of authentication factors describing new electronic activities being performed by the new user;
for each of the multiple groups of users, generating a distance measure between a set of authentication factors describing the new set of electronic activities performed by the new user and the new set of authentication factors describing the new set of electronic activities performed by each member of that group of users; and
selecting a new group of users for which the distance measure is a minimum over the multiple groups of users.

10. A computer program product as in claim 9, wherein the particular group of users is one group among multiple groups of users;
wherein classifying the new user as a member of the particular group of users includes:
for each of the multiple groups of users, generating a distance measure between the first set of authentication factors describing the electronic activities performed by the new user and the first set of authentication factors describing electronic activities performed by each member of that group of users, the distance measure indicating a measure of closeness between the electronic activities performed by the new user and the electronic activities performed by each member of that group of users; and
selecting, as the particular group of users, a group of users for which the distance measure is a minimum over the multiple groups of users.

11. A computer program product as in claim 10, wherein performing the authentication operation includes generating a risk score for the request from a risk model, the risk score being a number indicating a level of anomalous behavior from that expected of the new user, a large risk score indicating a high level of anomalous behavior, a small risk score indicating a low level of anomalous behavior, the risk model mapping each authentication factor of the first set of authentication factors and the second set of authentication factors to a respective weight, the weight indicating an importance of that authentication factor to the level of anomalous behavior of the new user.

12. A computer program product as in claim 11, wherein generating the distance measure includes, for each of the multiple groups of users:
for each of the first set of authentication factors, forming an absolute difference between that authentication factor describing a respective electronic activity performed by the new user and that authentication factor describing the respective electronic activity performed by each member of that group of users; and
producing, as the distance measure, a sum of products of (i) the absolute distance for each of the first set of authentication factors and (ii) the respective weight to which the risk model maps that authentication factor.

13. A computer program product as in claim 11, wherein, prior to receiving the first set of authentication factors describing the electronic activities being performed by the new user, the method further comprises:
selecting the electronic activities from a plurality of electronic activities performed by a large group of users, each of the first set of authentication factors describing a respective selected electronic activity performed by a user of the large group of users;
selecting the set of attributes from a plurality of attributes of the large group of users, each of the second set of authentication factors describing the an attribute of a user of the large group of users; and
forming each of the multiple groups of users based on the first set of authentication factors and the second set of authentication factors.

14. A computer program product as in claim 9, wherein the changes to the risk model are received periodically.

15. A computer program product as in claim 9, wherein the method further comprises, prior to receiving the first set of authentication factors, classifying the new user as a member of a preliminary group based on a preliminary set of authentication factors describing a set of attributes shared by the new user and each member of the preliminary group.

16. An electronic apparatus comprising memory and controlling circuitry coupled to the memory, the controlling circuitry being constructed and arranged to:
receive a first set of authentication factors describing electronic activities being performed by a new user;
based on the first set of authentication factors, classify the new user as a member of a particular group of users that (i) have performed the electronic activities and (ii) share a set of attributes described by a second set of authentication factors;
after classifying the new user as a member of the particular group of users, receive a request from the new user to access the electronic resource; and
in response to receiving the request, perform an authentication operation on the request based on the first set of authentication factors and the second set of authentication factors, the authentication operation producing an authentication result indicating whether to grant or deny the new user access to the electronic resource,
wherein new sets of authentication factors are received at specified intervals, and wherein, after classifying the new user as a member of the particular group of users, the controlling circuitry is further constructed and arranged to:
receive a new set of authentication factors, the new set of authentication factors describing new electronic activities being performed by the new user;
for each of the multiple groups of users, generate a distance measure between a set of authentication factors describing the new set of electronic activities performed by the new user and the new set of authentication factors describing the new set of electronic activities performed by each member of that group of users; and
select a new group of users for which the distance measure is a minimum over the multiple groups of users.

17. An electronic apparatus as in claim 16, wherein the particular group of users is one group among multiple groups of users;
wherein the controlling circuitry constructed and arranged to classify the new user as a member of the particular group of users is further constructed and arranged to:
for each of the multiple groups of users, generate a distance measure between the first set of authentication factors describing the electronic activities performed by the new user and the first set of authentication factors describing electronic activities performed by each member of that group of users, the distance measure indicating a measure of closeness between the electronic activities performed by the new user and the electronic activities performed by each member of that group of users; and
select, as the particular group of users, a group of users for which the distance measure is a minimum over the multiple groups of users.

18. An electronic apparatus as in claim 17, wherein the controlling circuitry constructed and arranged to perform the authentication operation is further constructed and arranged to generate a risk score for the request from a risk model, the risk score being a number indicating a level of anomalous behavior from that expected of the new user, a large risk score indicating a high level of anomalous behavior, a small risk score indicating a low level of anomalous behavior, the risk model mapping each authentication factor of the first set of authentication factors and the second set of authentication factors to a respective weight, the weight indicating an importance of that authentication factor to the level of anomalous behavior of the new user.

19. An electronic apparatus as in claim 18, wherein the controlling circuitry constructed and arranged to generate the distance measure is further constructed and arranged to, for each of the multiple groups of users:
for each of the first set of authentication factors, form an absolute difference between that authentication factor describing a respective electronic activity performed by the new user and that authentication factor describing the respective electronic activity performed by each member of that group of users; and
produce, as the distance measure, a sum of products of (i) the absolute distance for each of the first set of authentication factors and (ii) the respective weight to which the risk model maps that authentication factor.

* * * * *